United States Patent [19]

Silvey

[11] 4,075,967

[45] Feb. 28, 1978

[54] HYDRODYNAMIC CABLE FAIRING

[75] Inventor: Trevor Ian Silvey, Sherborne, England

[73] Assignee: Plessey Handel und Investments A.G., Zug, Switzerland

[21] Appl. No.: 750,816

[22] Filed: Dec. 15, 1976

[30] Foreign Application Priority Data

Dec. 19, 1975 United Kingdom ............... 52020/75

[51] Int. Cl.² ............................................. B63B 21/00
[52] U.S. Cl. .................................................... 114/243
[58] Field of Search ............... 114/243, 253, 254, 244, 114/245; 9/8 R; 254/190 R

[56] References Cited

U.S. PATENT DOCUMENTS

| 3,224,406 | 12/1965 | Clark | 114/243 |
| 3,434,451 | 3/1969 | Brainard | 114/244 |
| 3,611,976 | 10/1971 | Hale et al. | 114/243 |
| 3,645,224 | 2/1972 | Haberman | 114/245 |

FOREIGN PATENT DOCUMENTS 1,299,366  12/1972  United Kingdom ................ 114/244

Primary Examiner—Barry L. Kelmachter
Attorney, Agent, or Firm—Fleit & Jacobson

[57] ABSTRACT

A hydrodynamic cable fairing section comprising a nose portion for receiving a cable, a trailing body portion, and a plurality of vanes projecting outwardly from the body portion. The body portion includes two side surfaces that extend from the nose portion towards a trailing edge which forms part of the body portion. A plurality of vanes extend on both side surfaces and are substantially parallel to each other. Each of these vanes comprises flat surfaces which taper toward the trailing edge of the body portion.

8 Claims, 8 Drawing Figures

HYDRODYNAMIC CABLE FAIRING

This invention relates to a hydrodynamic cable fairing for use in underwater applications. More specifically, this invention relates to a hydrodynamic cable fairing section and to a hydrodynamic cable fairing comprised of a plurality of the cable fairing sections.

When objects such for example as oceanographic sensor systems, military decoys, plankton samplers and aerials are towed in water, they are usually attached to the towing vessel by means of a towing cable. This cable exerts a drag in the water and various attempts have been made to reduce this drag and therefore the tension on the cable.

It is an aim of the present invention to provide a novel hydrodynamic cable fairing section which, when forming a completed cable fairing on a cable, may provide a reduced drag on the cable when it is being towed in water. Low drag conditions on the cable mean correspondingly low cable tensions. These low cable tensions may then be effective to allow steep cable towing angles, giving good depth to cable length characteristics.

Accordingly, this invention provides a hydrodynamic cable fairing section comprising a nose portion for receiving a cable, a trailing body portion, and a plurality of vanes projecting outwardly from the body portion.

Preferably, the nose portion has a continuous surface and has a longitudinal through bore for receiving the cable. Other constructions may of course be employed for the nose portion but the continuous surface is preferred because it usually gives better hydrodynamic drag-reducing characteristics.

Various constructions for the body portion may also be employed. It is however presently preferred that the body portion tapers towards a trailing edge which forms part of the body portion. Advantageously, the nose portion is integrally formed with the body portion. In this case, the nose and body portions of the fairing section may be made in two parts which are clipped together such, for example, as by interlocking pins.

Preferably, each vane is flat and tapers towards a trailing edge which forms part of the vane. The vanes will usually be arranged in pairs, one on either side of the body portion. The vanes may be fitted to the body portion in any desired manner. Thus, for example, the vanes may be adhered to the body portion or they may fit in slots in the body portion. Also, if desired, the vanes may be provided with slots which receive appropriate abutments on the body portion.

When the fairing section is to form part of a completed cable fairing designed to be attached to a cable to be towed from a ship, then the cable fairing should be such as to cause the cable to be depressed in the water and preferably with a reduced cable tension as compared with hitherto available devices. In this case, each vane on the fairing section will normally be inclined at an acute angle with respect to the longitudinal axis of the body portion, the fairing section when in use under water then being caused by the vanes to be depressed in the water. Each vane may be inclined at an angle of from 5° to 60° with respect to the longitudinal axis of the body portion and measured from the end of the fairing section that will be uppermost in use.

When the fairing section is to be used for a fairing for depressing a cable under the water, it is advantageous to form the body portion with buoyancy means such for example as separately arranged glass spheres or smaller glass spheres arranged in the actual construction of the body portion. This gives the body portion a certain buoyancy thus enabling it to rotate with respect to the cable and to vertically align.

When the fairing section is to form part of a cable fairing towed from a vessel such as a submarine which is already under water, then it is usually desirable that the cable will rise to the surface, for example, to carry a surface aerial from the submarine to the surface of the water. In this case, it will be apparent that the hydrodynamic cable fairing should enable the cable to rise in the water. In this case, the fairing section is such that each vane will normally be inclined at an obtuse angle with respect to the longitudinal axis of the body portion, the fairing section when in use in water then being caused by the vanes to be raised in the water. Preferably, each vane is inclined at an angle of from 120° to 175° with respect to the longitudinal axis of the body portion and measured from the end of the fairing section that will be uppermost in use.

When the fairing section is to form part of a fairing that is to rise as aforesaid, then the fairing section is preferably formed with ballast means such for example as weights to enable the fairing to rotate with respect to the cable and to vertically align.

The fairing section may be made from any desired material. Presently preferred materials are rubber or plastics materials. However, the fairing section can also be made of a metal such, for example, as aluminium or it can also be made from an alloy. A presently preferred plastics material is a thermoplastics copolymer of styrene, butadiene and acrylonitrile known under the trade name of ABS.

The fairing can be made solid or hollow. When hollow, it can be filled with buoyancy means or ballast as desired.

When the fairing sections of the invention are to be attached to a cable to form a completed cable fairing, it is often preferred that the discrete sections be provided with attachment means so that one fairing section can be secured to another fairing section. This ensures that the fairing sections act substantially together. Advantageously, the attachment means should be such as to enable a slight movement between the different fairing sections. Preferably, the attachment means are formed integrally with the body portion of each fairing section. The attachment means may be, for example, tongues which mate with other tongues on other fairing sections.

A hydrodynamic cable fairing in accordance with the invention comprises a plurality of hydrodynamic cable fairing sections of the invention.

Also within the scope of the present invention is the combination of a hydrodynamic cable fairing of the invention and a cable. Preferably, the cable will be provided with spacer means between each fairing section or between groups of fairing sections. This is desirable in order to prevent the fairing sections all moving to the bottom end of the cable when being towed under water from a surface vessel or moving to the top of the cable when being towed under water from a submarine. The spacer means may comprise rings or other devices clipped, crimped, clamped or otherwise secured to the cable.

Embodiments of the invention will now be described solely by way of example and with reference to the accompanying drawings in which, FIG. 1 shows in somewhat diagrammatic form a self-depressing hydrodynamic cable system in accordance with the invention;

Referring to FIGS. 1, 3, 4 and 5, there is shown a ship 2 on a sea 4 carrying a cable 6. In order to ensure that the cable 6 is maintained in a substantially straight line the end of the cable 6 is provided with a streamer 8 of a known type. The use of such streams is well known. Attached to the end of the cable 6 and not shown, can be any type of device such for example as a decoy buoy, a mine or any desired scientific device.

Figure 3:
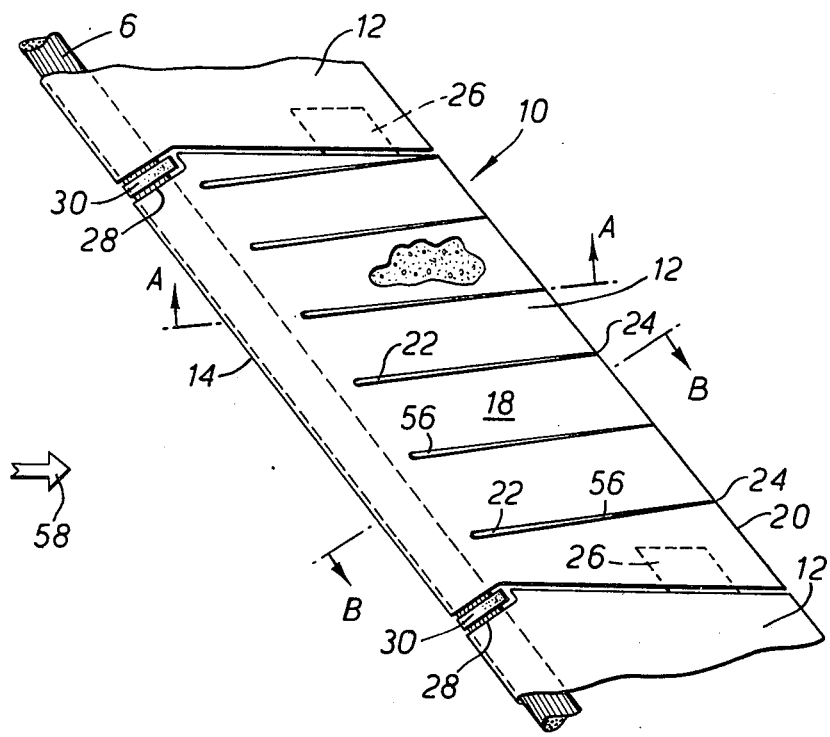
FIG. 3 is a detail of the cable fairing used in FIG. 1.
Figures 4, 5:
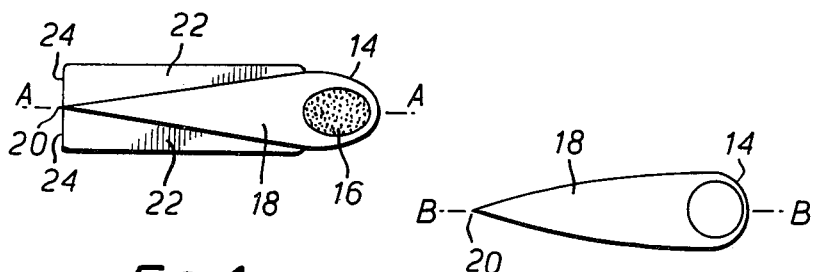
FIG. 4 is a section on the line A—A shown in FIG. 3.
FIG. 5 is a section on the line B—B shown in FIG. 3; but omitting the vane.

As shown most clearly in FIGS. 3, 4 and 5, the cable 6 is provided with a hydrodynamic cable fairing 10 comprised of a plurality of fairing sections 12. The section 12 can articulate about the cable 6.

Each fairing section 12 comprises a nose portion 14 which is shaped as shown most clearly in FIGS. 4 and 5 and which has a longitudinal through bore 16. The cable 6 passes through the bore 16 as shown in the drawings. Formed integrally with the nose portion 14 is a trailing body portion 18 which is shaped as shown most clearly in FIGS. 4 and 5. The trailing body portion 18 tapers towards its trailing edge 20 and is formed integrally with the nose portion 14.

Attached to the two sides of the body portion 18 are outwardly projecting vanes 22. The vanes 22 may be attached to the body portion 18 by various means such as adhesives, e.g. epoxy resin adhesive. As shown most clearly in FIG. 3, the vanes taper from the end nearest the nose portion 14 towards their trailing ends 24.

The body portions 18 are provided with mating tongues 26 which enable the various fairing sections 12 to be attached to each other.

Figure 1:
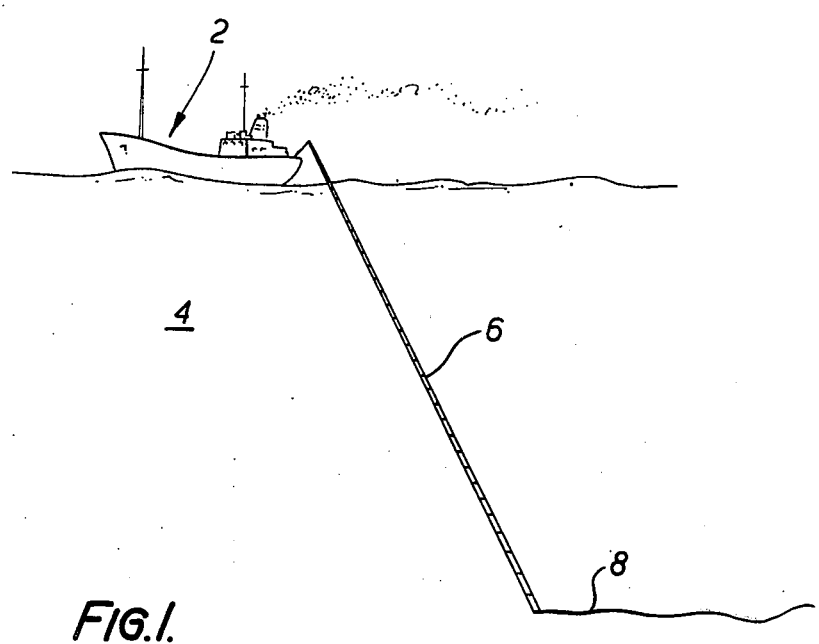

The fairing sections 12 are provided with shoulders 28 which enable spacer rings 30 to be crimped to the cable 6 as shown. This prevents the fairing sections 12 from sliding down the cable and trying to crush each other at the bottom of the cable 6 when they are being towed as shown in FIG. 1.

In the illustrated embodiment of FIG. 3, with a flow of 15 knots in the direction of arrow 58, it has been found advantageous to have the vanes 22 inclined at an angle of 5° to the direction of flow. The vanes 22 may be pitched 0.7 inches apart and they may be 2 inches long. The fairing sections 12 may be 4 inches long.

Figure 2:
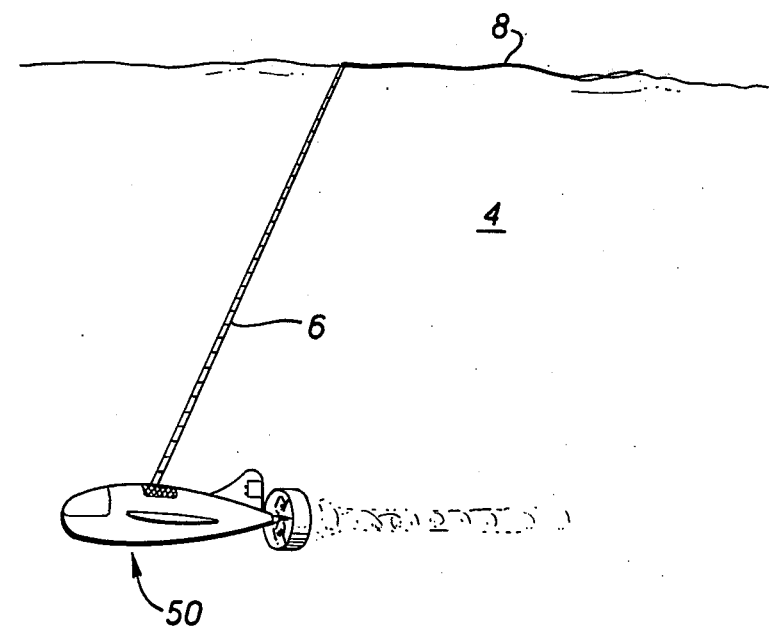
FIG. 2 shows in somewhat diagrammatic form a self-elevating hydrodynamic cable system in accordance with the invention.
Figure 6:
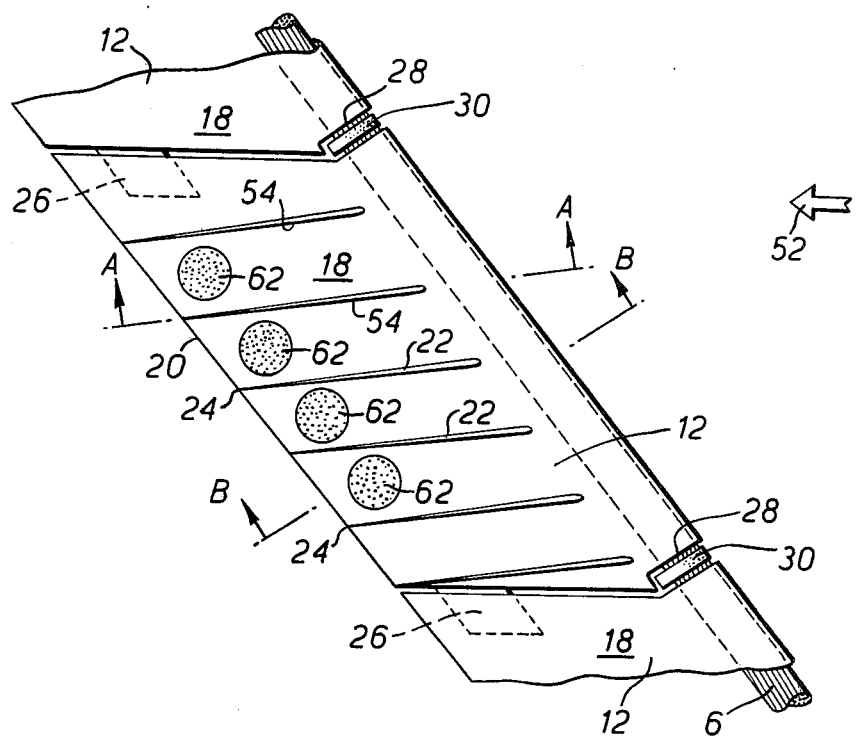
FIG. 6 is a detail of the cable fairing used in FIG. 2.
Figure 7:
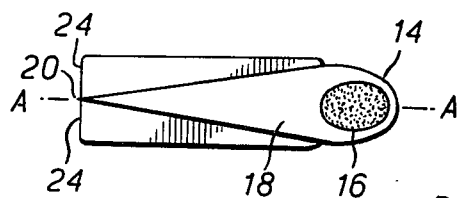
FIG. 7 is a cross-section on the line A—A shown in FIG. 6.
Figure 8:
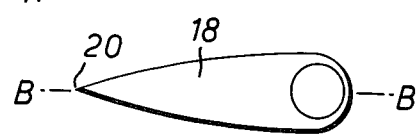
FIG. 8 is a cross-section on the line B—B shown in FIG. 6 but omitting the vane.

Referring now to FIGS. 2, 6, 7 and 8, there is shown in FIG. 2 a submarine 50 carrying a cable 6 having a streamer 8 which ensures that the cable 6 remains substantially straight. The self-elevating hydrodynamic cable fairing system illustrated in FIG. 2 is advantageous for carrying an aerial or other device (not shown) to the surface of the water 4 from the submarine 50. In view of the fact that many of the parts of the cable fairing shown in FIGS. 6, 7 and 8 are the same as that shown in FIGS. 3, 4 and 5, these parts have been given the same reference numerals and their precise construction will not be described again in detail.

It will be apparent that in order to get the cable 6 to become elevated, the inclination of the vanes 22 shown in FIGS. 6, 7 and 8 has been substantially reversed. Thus, with a flow of 15 knots proceeding in the direction of the arrow 52 shown in FIG. 6, the vanes are inclined at an angle of 5° to the direction of this flow. It will be appreciated that this angle of 5° enables the water to contact the underside 54 of each vane 22. In contrast, in the embodiment of FIGS. 3, 4 and 5, the water flow coming in the direction of the arrow 58 contacts the upper side 56 of the vanes 22.

In FIG. 6, the angle of towing compared with the longitudinal axis of the fairing section (which is effectively the same as the trailing edge portion 20 of the body portion 18) can be, for example, 52°. A similar angle of towing can be employed in FIG. 3.

Referring to FIGS. 3 to 5, since the fairing sections are designed to depress the cable, the body portion 18 is preferably provided with some form of buoyancy means. The buoyancy means is shown in FIG. 3 as glass balls formed integrally with the body portion 18. When the body portion is moulded from a plastics material, it is relatively easy to include the glass ball during the moulding process.

Referring to FIGS. 6 to 8, since the fairing sections 12 are to take the cable 6 to the surface of the water 4, the body portions 18 are preferably provided with some form of ballast. This ballast is shown in FIG. 6 as weighted balls 62.

In both of the embodiments of the invention illustrated in the drawings, it has been found that in addition to low cable drag and tensions, the cable 6 can be towed in a substantially straight line at a substantially constant angle to the horizontal over a range of towing speeds. The depth achieved by the cable 6 when paid out from the ship 2 may be related solely to the length of cable paid out, irrespective of the speed of the ship 2.

It is to be appreciated that the embodiments of the invention described above have been given by way of example only and that modifications may be effected. Thus the size of the vanes can be varied as desired. By way of example, it is mentioned that the fairing sections could be from 3–6 inches long and from 1½ to 3 inches wide. The precise shape and size of the fairing sections may obviously be varied as desired to suit particular applications.

What we claim is:

1. A hydrodynamic cable fairing section comprising a nose portion, a body portion having two side surfaces, and vane means comprising a plurality of vanes connected to each side surface of said body portion, said plurality of vanes being substantially parallel to each other, wherein said nose portion has a continuous curved surface and a longitudinal through bore means for receiving a cable, said body portion extending from said nose portion and tapering from said nose portion towards a trailing edge which forms part of the body portion, and each of said vanes comprises flat surfaces which taper toward said trailing edge of said body portion.

2. A hydrodynamic cable fairing section according to claim 1 wherein said body portion is integrally formed with said nose portion.

3. A hydrodynamic cable fairing section according to claim 1 wherein said body portion includes ballast means for enabling the fairing section to rotate with respect to the cable and to vertically align.

4. A hydrodynamic cable fairing section according to claim 1 including attachment means for attaching said fairing section to adjacent fairing sections.

5. A hydrodynamic cable fairing section as claimed in claim 1 wherein said vane means further comprise a plurality of pairs of vanes, each of said pairs comprising a first vane connected to one side surface of the body portion, and a second vane connected to the other side surface of the body portion, said first and second vanes positioned in the same plane, and wherein said plurality of pairs of vanes are substantially parallel to each other.

6. A hydrodynamic cable fairing section as claimed in claim 1 wherein each vane of said plurality of vanes is inclined at an acute angle between 5 and 60 degrees with respect to the longitudinal axis of said body portion.

7. A hydrodynamic cable fairing section as claimed in claim 1 wherein each vane of said plurality of vanes is inclined at an obtuse angle between 120 and 175 degrees with respect to the longitudinal axis of said body portion.

8. A hydrodynamic cable fairing comprising a plurality of cable fairing sections and means for interconnecting said cable fairing sections, wherein each of said cable fairing sections comprise a nose portion and a body portion having two side surfaces, and a plurality of vanes connected to each side surface of said body portion, said plurality of vanes being substantially parallel to each other, wherein said nose portion has a continuous curved surface and a longitudinal through bore means for receiving a cable, said body portion extending from said nose portion and tapering from said nose portion towards a trailing edge which forms part of the body portion, and each of said vanes comprises flat surfaces which taper toward said trailing edge of said body portion.

* * * * *